3,317,501
SOLUBLE POLY-4-METHYL-1-PENTENE
William R. Edwards, Baytown, Tex., assignor, by mesne assignments, to Esso Research and Engineering Company, Elizabeth N.J., a corporation of Delaware
No Drawing. Filed Oct. 16, 1963, Ser. No. 316,524
12 Claims. (Cl. 260—93.7)

The present invention relates to a method of polymerizing 4-methyl-1-pentene. More particularly, the present invention relates to a method of polymerizing 4-methyl-1-pentene to obtain high molecular weight polymers while utilizing moderate temperatures of polymerization. In its most specific aspects, the present invention relates to a method of producing a poly-4-methyl-1-pentene having a molecular weight greater than 50,000 at reaction temperatures between $-20°$ F. and $+100°$ F.

Normally, in the polymerization of olefins, the desirable higher molecular weight polymers are obtained only at temperatures of $-40°$ F. to $-150°$ F. It is generally considered that the molecular weight of polymers increases as the temperature of polymerization is lowered. Since the higher molecular weights are desired for most commercial applications involving polymers, it has been the common practice to use temperatures as low as economically feasible. This increases the cost of production both from the standpoint of initial investment and operating costs in providing sufficient refrigeration to maintain these low temperatures.

Poly-4-methyl-1-pentene is an elastomeric polymer having uses similar to polyisobutylene. For example, it may be blended with polypropylene to get improved impact characteristics at low temperatures. Currently, temperatures of $-40°$ F. to $-150°$ F. are considered to be necessary in order to obtain high molecular weight poly-4-methyl-1-pentene; that is, molecular weights in the range of 75,000 to 100,000 as a minimum.

It has been found that high molecular weight poly-4-methyl-1-pentene can be produced at temperatures of $-20°$ F. to $+100°$ F. by using the proper catalyst-solvent system, thus allowing the polymerization reaction to be accomplished at the boiling point of the solvent system which is used. This expedient allows the use of autorefrigeration as a means for controlling the temperature of the highly exothermic reaction, and minimizes the refrigeration facilities which must be provided for the polymerization unit.

By the practice of the present invention, it has been found that high molecular weight poly-4-methyl-1-pentene can be produced at the higher temperatures by using solid aluminum chloride as a catalyst, with a suitable deactivator. Pure methyl chloride is a preferred solvent, but suitable solvents are paraffins which do not contain a tertiary carbon atom, such as the group consisting of neopentane, n-pentane, n-hexane, etc., all of which must be combined with at least 4% (preferably 20%) methyl halide such as methyl chloride. Pure methyl halide is preferred as the solvent in these systems, with methyl chloride being the specific halide which is preferred. The methyl halide acts as an "activator" for the catalyst in a manner as yet unknown. It is thought that a halide transfer between the methyl halide and the catalyst may be the operative factor.

It has been found, however, that when using solid aluminum chloride in combination with a methyl halide-containing catalyst for the polymerization of 4-methyl-1-pentene, at the higher temperature the 4-methyl-1-pentene polymer tends to become cross-linked and therefore insoluble in hydrocarbons. Where a soluble polymer product is preferred, for example where solution casting is to be used, the tendency to produce the insoluble (cross-linked) poly-4-methyl-1-pentene is controlled by adding deactivators to the solvent system. These deactivators shift the polymer reaction in the direction of forming a soluble polymer, even though some insoluble polymer may also be formed in the reaction.

Tertiary carbon-containing paraffins have been found to be reactive in the present process to such an extent that they may be used as deactivators to favor the formation of soluble polymer at the expense of insoluble polymer. Whereas compounds such as isobutane and isopentane have heretofore been thought to be nonreactive under such conditions as those employed in the present process, it has been found to the contrary that even small amounts of these tertiary carbon-containing paraffins react in the system to a sufficient extent that the formation of soluble polymer is enhanced at the expense of the formation of insoluble polymer, and employment of large quantities of the deactivator results in a radical lessening in the molecular weight of the polymer formed. Other suitable deactivators are found in the diolefins such as isoprene, 1,3-butadiene, and 1,4-pentadiene, monoolefins such as butene-1, pentene-1, etc., and higher alkyl chlorides such as ethyl chloride, propyl chloride, etc. As a generalization, it may be stated that compounds which easily form carbonium ions can be used as deactivators if employed in small amounts. Isobutylene is exemplary of such a carbonium ion-forming compound.

In order to establish the operability of the various catalysts set forth, the following runs were made.

*Example I*

To 50 cc. of refluxing methyl chloride at atmospheric pressure was added 0.50 g. of solid aluminum chloride powder. Immediately thereafter were added 10 cc. of 4-methyl-1-pentene. A vigorous polymerization occurred instantaneously, yielding 100% poly-4-methyl-1-pentene based on monomer charged. The polymer was exclusively insoluble in hydrocarbon. No soluble polymer was formed. The temperature of the reaction was $-10°$ F.

*Example II*

The procedure of Example I was followed with the exception that the methyl chloride contained 1% isoprene. A soluble solid 4-methyl-1-pentene having a molecular weight of about 75,000 was obtained. No insoluble polymer was formed.

*Example III*

To a refluxing mixture of 50 cc. of methyl chloride and 20 cc. of 4-methyl-1-pentene was added 0.5 cc. of a 15 weight percent solution of monoethyl aluminum dichloride in n-heptane. A moderately fast reaction was observed which gave a polymer yield of 30%, based on monomer charged. About 40% of the polymer product was insoluble in hydrocarbons, but the soluble polymer product had a molecular weight within the range of 200,000 to 250,000. The temperature of the reaction was about $-10°$ F.

*Example IV*

The procedure of Example III was followed using various amounts of diethyl aluminum chloride. No reaction was obtained in the case. Thus, diethyl aluminum chloride is established not to be effective as a catalyst in this reaction.

By a comparison of Examples I through IV, it is seen that the use of solid aluminum chloride in connection with methyl chloride solvent produced an exclusively insoluble poly-4-methyl-1-pentene. When isoprene was used as the deactivator, the solid aluminum chloride catalyst produced a soluble poly-4-methyl-1-pentene having a molecular weight of 75,000. Thus, it is seen that aluminum chloride may be used as a solid if a suitable deactivator is employed.

Thus, it is shown by Examples I to IV that the polymerization of 4-methyl-1-pentene may be carried out at temperatures of −10° F. or greater while using solid aluminum chloride as a catalyst, with a suitable deactivator.

In order to establish the suitability of various solvents for use in the process of the present invention, a number of runs were made while utilizing solid aluminum chloride as a catalyst. In general, the procedure of Example I was utilized. The results of these runs are set forth below in Table I.

TABLE I.—EVALUATION OF SOLVENTS

| Example | Catalyst | Solvent | Temperature, °F. | Polymer | Molecular Weight | Remarks |
|---|---|---|---|---|---|---|
| II | Solid AlCl₃ | Methyl chloride | −10 | Insoluble | | No soluble polymer obtained. |
| V | do | Methyl bromide | +45 | do | | Do. |
| VI | do | 20% Methyl chloride, 80% neopentane | 30 | Soluble solid | 100,000 | All polymer was soluble. |
| VII | do | 4% Methyl chloride, 96% neopentane | 50 | do | 75,000+ | Do. |
| VIII | do | Neopentane | 50 | Soluble semi-solid | 10,000 | Drastic loss in molecular weight. |
| IX | do | 50% Methyl chloride, 50% n-pentane | −10 | 48% Soluble solid | 150,000 | Shifts toward soluble, high molecular weight polymer. |
| X | do | n-Pentane | 100 | Soluble semi-solid | 10,000 | Drastic loss in molecular weight. |
| XI | do | Ethyl chloride | 54 | Viscous oil | <5,000 | Do. |
| XII | do | Propyl chloride | 117 | do | <5,000 | Do. |
| XIII | do | Carbon tetrachloride | 170 | do | <5,000 | Do. |
| XIV | do | Carbon disulfide | 115 | Soluble semi-solid | 10,000 | Do. |

Thus, it is seen that a wide range of solvents can be used. In the case of methyl chloride and solid aluminum chloride, it is noted that the use of a diluent such as neopentane and n-pentane which dilutes the methyl chloride shifts the reaction from the formation of insoluble polymer in the direction of forming the soluble polymer. However, the use of these diluents alone (without a methyl halide) results in the formation of very low molecular weight products. Thus, it is established that the presence of a methyl halide is essential in the reaction.

Note that Examples XI, XII, and XIII illustrate that alkyl halides other than methyl halides are deactivators in the claimed system.

In order to establish the use of tertiary carbon-containing deactivators for the solid aluminum chloride, another series of experimental runs were made. In these runs, the procedure of Example II was used and various tertiary carbon-containing compounds were included in the methyl chloride solvent.

TABLE II.—EVALUATION OF DEACTIVATORS FOR SOLID AlCl₃

| Example | Methyl Chloride Containing— | Ratio of t-carbon compound 4-methyl-1-pentene | Product | Molecular Weight of Soluble Polymer |
|---|---|---|---|---|
| XV | Isopentane (1%) | 0.03 | 45% Soluble | 150,000 |
| XVI | Isobutane (1%) | 0.03 | 20% Soluble | 150,000 |
| XVII | Isobutane (2%) | 0.2 | 100% Soluble | 10,000 |
| XVIII | Isobutylene (5%) | 0.33 | do | 10,000 |
| XIX | 3-methyl-1-butene (5%) | 0.17 | 55% Soluble | 75,000 |
| XX | 3-methyl-1-butene (13%) | 1.0 | 100% Soluble | <50,000 |
| XXI | 3-methyl-1-pentene (20%) | 1.0 | 75% Soluble | 50,000 |

From Table II, then, it is obvious that the tertiary carbon-containing compound which is to be used in controlling the insolubility of the product is to be used in extremely small quantities or the molecular weight of the final product is severely reduced. However, the amount of tertiary carbon-containing compound to be used depends not only on the particular molecular weight which is desired, but also the nature of the tertiary carbon-containing compound itself. Thus, it is seen that the use of 0.17 mol of 3-methyl-1-butene per mol of 4-methyl-1-pentene produces 55% soluble product having a molecular weight of 75,000, whereas the use of approximately the same amount of isobutane produces a 100% soluble polymer product having a molecular weight of only 10,000. Likewise, the isobutylene appears to have a similarly high activity in reducing the molecular weight of the product. The amount of the tertiary carbon-containing compound can be easily determined, however, by routine experimentation by those skilled in the art.

Thus, it is submitted that the present invention provides a method of polymerizing 4-methyl-1-pentene at higher temperatures than those heretofore thought possible, without suffering a deleterious loss in molecular weight of the final product. Further, by the practice of the present invention, the polymer product may be produced in a soluble form suitable for solution casting.

Having disclosed in detail the essence of the present invention, what is desired to be covered by Letters Patent should be limited only by the appended claims and not by the specific examples herein given.

I claim:

1. A method of polymerizing 4-methyl-1-pentene which comprises
    contacting 4-methyl-1-pentene at −20° F. to +100° F. with a solid aluminum chloride catalyst,
    with a solvent containing at least 4% by weight methyl halide,
    and an effective amount of a catalyst deactivator chosen from the group consisting of alkyl chlorides containing at least two carbon atoms, diolefins, and tertiary carbon-containing compounds other than 4-methyl-1-pentene.

2. A method in accordance with claim 1 wherein the methyl halide is methyl chloride.

3. A method in accordance with claim 1 wherein the methyl halide is methyl bromide.

4. A method in accordance with claim 1 wherein said solvent contains at least 20% methyl halide.

5. A method in accordance with claim 4 wherein the methyl halide is methyl chloride.

6. A method in accordance with claim 4 wherein the methyl halide is methyl bromide.

7. A method in accordance with claim 1 wherein the solvent is 100% methyl chloride.

8. A method in accordance with claim 1 wherein the solvent is 100% methyl bromide.

9. A method of polymerizing 4-methyl-1-pentene which comprises contacting 4-methyl-1-pentene at a temperature of of about −10° F.

with a solid aluminum chloride catalyst and with a refluxing methyl chloride solvent, said methyl chloride solvent containing 1% isoprene as a catalyst deactivator, whereby a hydrocarbon-soluble poly-4-methyl-1-pentene is obtained.

10. A method of polymerizing 4-methyl-1-pentene which comprises contacting 4-methyl-1-pentene at a temperature of about −10° F.

with a solid aluminum chloride catalyst and with a refluxing methyl chloride solvent, said methyl chloride solvent containing 1% isopentane as a deactivator, whereby a hydrocarbon-soluble poly-4-methyl-1-pentene is obtained.

11. A method of polymerizing 4-methyl-1-pentene which comprises contacting 4-methyl-1-pentene at a temperature of about −10° F.

with a solid aluminum chloride catalyst and with a refluxing methyl chloride solvent, said methyl chloride containing from about 1% to about 2% isobutane as a deactivator, whereby a hydrocarbon-soluble poly-4-methyl-1-pentene is obtained.

12. A method of polymerizing 4-methyl-1-pentene which comprises contacting 4-methyl-1-pentene at a temperature of about −10° F.

with a solid aluminum chloride catalyst and with a refluxing methyl chloride solvent, said methyl chloride containing about 5% 3-methyl-1-butene as a deactivator, whereby a hydrocarbon-soluble poly-4-methyl-1-pentene product is obtained.

No references cited.

JOSEPH L. SCHOFER, *Primary Examiner.*

JAMES A. SEIDLECK, *Examiner.*

M. B. KURTZMAN, *Assistant Examiner.*